US011948496B2

(12) United States Patent
Yoon et al.

(10) Patent No.: US 11,948,496 B2
(45) Date of Patent: Apr. 2, 2024

(54) DISPLAY DEVICE AND METHOD OF DRIVING THE SAME

(71) Applicant: Samsung Display Co., LTD., Yongin-si (KR)

(72) Inventors: Seok Young Yoon, Yongin-si (KR); Dong Won Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 118 days.

(21) Appl. No.: 17/406,596

(22) Filed: Aug. 19, 2021

(65) Prior Publication Data

US 2022/0148492 A1 May 12, 2022

(30) Foreign Application Priority Data

Nov. 12, 2020 (KR) ........................ 10-2020-0150882

(51) Int. Cl.
*G09G 3/32* (2016.01)
*G09G 5/10* (2006.01)

(52) U.S. Cl.
CPC ................. *G09G 3/32* (2013.01); *G09G 5/10* (2013.01); *G09G 2320/041* (2013.01)

(58) Field of Classification Search
CPC ....... G09G 3/32; G09G 5/10; G09G 2320/041
See application file for complete search history.

(56) References Cited

U.S. PATENT DOCUMENTS 9,072,143 B2 * 6/2015 Takahashi .............. H05B 45/46
10,504,456 B2 * 12/2019 Inokawa .............. G09G 3/3225
10,817,082 B1 * 10/2020 Yildiz ................. G06F 3/03545
2003/0222861 A1 * 12/2003 Nishikawa ............. G09G 3/006 345/204
2004/0252111 A1 * 12/2004 Cheon .................. G09G 3/3611 345/204
2006/0152454 A1 * 7/2006 Cok ..................... G09G 3/3208 345/82
2008/0290806 A1 * 11/2008 Tada .................... G09G 3/3233 315/307
2009/0027313 A1 * 1/2009 Miyamoto ........... G09G 3/3233 345/76
2009/0079359 A1 * 3/2009 Shteynberg ............ H05B 45/24 315/291
2010/0026725 A1 * 2/2010 Smith .................. G09G 3/3233 345/204
2010/0214271 A1 * 8/2010 Mizusako ............ G09G 3/3648 345/204

(Continued)

FOREIGN PATENT DOCUMENTS

KR 10-2019-0119693 10/2019

*Primary Examiner* — Amare Mengistu
*Assistant Examiner* — Jennifer L Zubajlo
(74) *Attorney, Agent, or Firm* — KILE PARK REED & HOUTTEMAN PLLC

(57) ABSTRACT

A display device includes light-emitting units including at least one element set including light-emitting elements; a first storage unit that stores temperature data of the at least one element set; and a compensator that extracts a first element set having temperature data of a higher temperature than an average temperature among the temperature data of the at least one element set and compensates for image data based on the extracted first element set to generate compensation data.

20 Claims, 7 Drawing Sheets

(56) References Cited

U.S. PATENT DOCUMENTS

| | | | | |
|---|---|---|---|---|
| 2012/0223289 A1* | 9/2012 | Gwo | H01L 33/18 | 438/35 |
| 2012/0299801 A1* | 11/2012 | Kitano | F21K 9/00 | 362/249.02 |
| 2013/0076250 A1* | 3/2013 | Logiudice | H05B 45/37 | 315/161 |
| 2013/0285568 A1* | 10/2013 | Takeda | H05B 45/395 | 315/193 |
| 2013/0320870 A1* | 12/2013 | Oyaizu | H05B 45/20 | 315/192 |
| 2014/0104259 A1* | 4/2014 | Oh | G09G 3/3266 | 345/212 |
| 2015/0049127 A1* | 2/2015 | Masumoto | G09G 3/3233 | 445/6 |
| 2016/0035949 A1* | 2/2016 | Stormberg | H05B 45/10 | 257/88 |
| 2016/0161742 A1* | 6/2016 | Yonemoto | H05B 47/105 | 349/11 |
| 2016/0307498 A1* | 10/2016 | Chaji | G09G 3/3291 | |
| 2017/0032723 A1* | 2/2017 | Kim | G09G 3/3266 | |
| 2017/0032745 A1* | 2/2017 | Sakai | G09G 3/3413 | |
| 2017/0345358 A1* | 11/2017 | Xu | G09G 3/3225 | |
| 2018/0090103 A1* | 3/2018 | Zhang | G01K 13/00 | |
| 2018/0175104 A1* | 6/2018 | Kang | H01L 33/005 | |
| 2019/0164486 A1* | 5/2019 | An | G09G 3/3233 | |
| 2019/0200427 A1* | 6/2019 | Albou | H05B 45/14 | |
| 2019/0318685 A1* | 10/2019 | Park | G09G 3/32 | |
| 2019/0333452 A1* | 10/2019 | Kim | G09G 3/3225 | |
| 2020/0041349 A1* | 2/2020 | Capps | G09G 3/32 | |
| 2023/0013528 A1* | 1/2023 | Jang | G09G 3/2096 | |

* cited by examiner

DISPLAY DEVICE AND METHOD OF DRIVING THE SAME

CROSS-REFERENCE TO RELATED APPLICATION(S)

This application claims priority to and benefits of Korean Patent Application No. 10-2020-0150882 under 35 U.S.C. § 119 filed on Nov. 12, 2020 in the Korean Intellectual Property Office, the entire contents of which are incorporated herein by reference.

BACKGROUND

1. Technical Field

The disclosure relates to a display device and a method of driving the same.

2. Description of the Related Art

Recently, as interest in information displays is increasing, research and development for display devices are continuously being conducted.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment provides a display device of which overall luminous efficiency is increased, and a method of driving the same.

A display device according to an embodiment may include light-emitting units including at least one element set including light-emitting elements; a first storage unit that stores temperature data of the at least one element set; and a compensator that extracts a first element set having temperature data of a higher temperature than an average temperature among the temperature data of the at least one element set and compensates for image data based on the first element set to generate compensation data.

The compensator may compensate for the image data to generate the compensation data such that a current less than a predetermined current may be applied to the light-emitting units.

The predetermined current may be an initial current applied to the first element set.

The average temperature may correspond to an average value of the temperature data of the at least one element set.

The compensator may extract a second element set having the average temperature among the temperature data of the at least one element set.

A number of the light-emitting elements included in the first element set may be less than a number of light-emitting elements included in the second element set.

Currents of a same magnitude may be applied to the first element set and the second element set.

The storage unit may store luminance data of the at least one element set, and the compensator may compensate for the image data based on luminance data of the second element set to generate the compensation data.

A maximum value of a current density of the second element set may be less than or equal to 30% of a current density corresponding to a maximum luminous efficiency of the second element set according to the compensation data.

The temperature data of the at least one element set may be provided from an external imaging device.

The light-emitting elements may have a column shape.

In a method of driving a display device including a display unit, the method may include receiving temperature data of at least one element set including light-emitting element, the at least one element set being included in a light-emitting unit; extracting a first element set having temperature data of a higher temperature than an average temperature among the temperature data of the at least one element set; and compensating for image data based on the first element set to generate compensation data.

The compensation data may be generated such that a current less than an initial current applied to the first element set may be applied to the light-emitting unit.

The method may further include applying the compensation data to the display unit.

The temperature data of the at least one element set may be provided from an external imaging device.

In a method of driving a display device including a display unit, the method may include receiving temperature data and luminance data of at least one element set including light-emitting elements, the at least one element set being included in a light-emitting unit; extracting a second element set having an average temperature among the temperature data of the at least one element set; and compensating for image data based on the second element set to generate compensation data.

The compensation data may be generated by compensating for the image data based on the luminance data of the extracted second element set.

The method may further include applying the compensation data to the display unit.

A maximum value of a current density of the second element set may be less than or equal to 30% of a current density corresponding to a maximum luminous efficiency of the second element set according to the compensation data.

According to an embodiment, a light efficiency can be improved by controlling a current having a value less than an initial current applied to the light emitting unit, corresponding to temperature of the element sets.

Since the luminance characteristic is improved according to an improvement in light efficiency, power consumption can be reduced and a life of the display device can be increased.

Effects according to an embodiment are not limited by the contents illustrated above, and more varied effects are included in the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
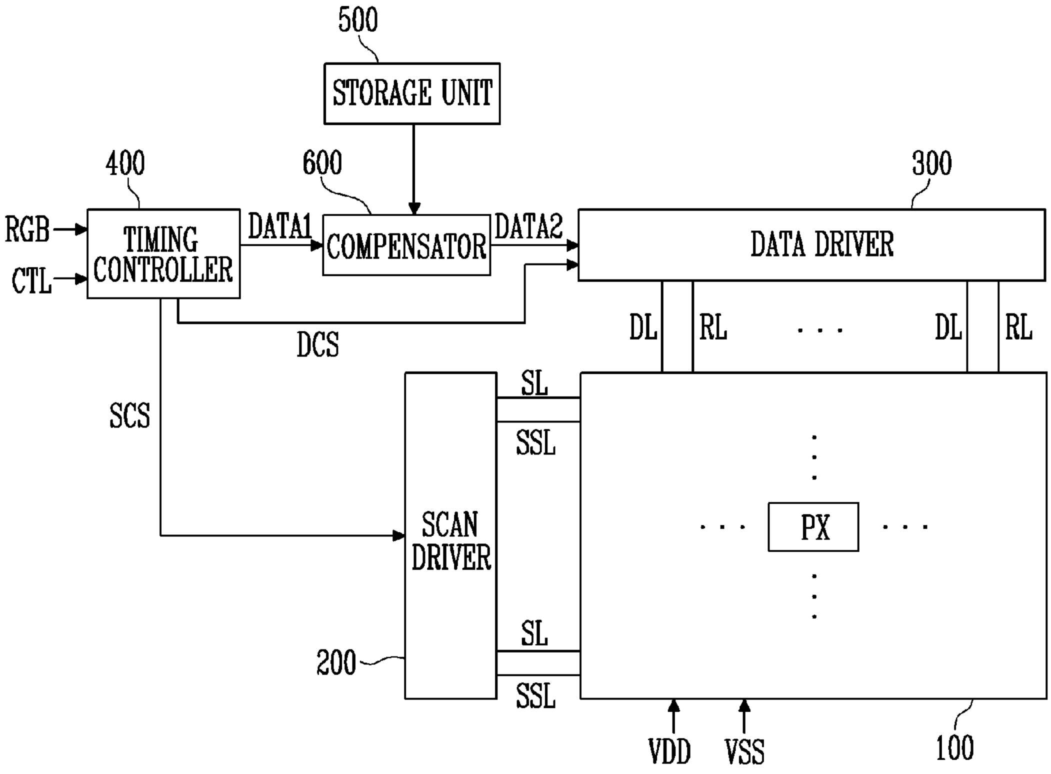
FIG. 1 is a block diagram illustrating a display device according to an embodiment.

While the disclosure is open to various modifications and alternative embodiments, embodiments thereof will be described and illustrated by way of example in the accompanying drawings. However, it should be understood that there is no intention to limit the disclosure to the embodiments disclosed, and, on the contrary, the disclosure is intended to cover all modifications, equivalents, and alternatives falling within the spirit and scope of the disclosure.

In the drawings, sizes, thicknesses, ratios, and dimensions of the elements may be exaggerated for ease of description and for clarity. Like numbers refer to like elements throughout.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Although the terms "first", "second", etc. are used herein to describe various elements, these elements should not be limited by these terms. The terms are used only for the purpose of distinguishing one element from another. For example, without departing from the scope of the disclosure, a first element could be termed a second element, and similarly a second element could be also termed a first element. A single form of expression is meant to include multiple elements unless otherwise stated.

It will be understood that the terms "comprises" and/or "comprising," or "includes" and/or "including," "have", "has" and/or "having" and variations thereof when used in this specification, specify the presence of stated features, integers, steps, operations, elements, components, and/or combinations thereof but do not preclude the presence or addition of one or more other features, integers, steps, operations, elements, components, and/or combinations thereof.

In the application, it will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. Each block, unit, and/or module of embodiments may be physically separated into two or more interacting and discrete blocks, units, and/or modules without departing from the scope of the disclosure. Further, the blocks, units, and/or modules of embodiments may be physically combined into more complex blocks, units, and/or modules without departing from the scope of the disclosure.

Hereinafter, a display device according to embodiments will be described with reference to the drawings relating to embodiments. In the following description, the singular forms “a,” “an,” and “the” are intended to include the plural forms as well, unless the context clearly indicates otherwise.

FIG. 1 is a block diagram illustrating a display device according to an embodiment.

Referring to FIG. 1, the display device according to an embodiment may include a display unit 100, a scan driver 200, a data driver 300, a timing controller 400, a storage unit 500, and a compensator 600.

The display device may be a flat display device, a flexible display device, a curved display device, a foldable display device, a bendable display device, or a stretchable display device. The display device may be applied to a transparent display device, a head-mounted display device, a wearable display device, or the like within the spirit and the scope of the disclosure. The display device may be applied to various electronic devices such as a smartphone, a tablet personnel computer, a smart pad, a television (TVs), and a monitor.

The display device may be implemented as a self-luminous display device including a plurality of self-luminous elements. For example, the display device may be an organic light-emitting display device including organic light-emitting elements, a display device including inorganic light-emitting elements, or a display device including light-emitting elements including an inorganic material and an organic material in combination. However, this is merely an example, and the display device may be implemented as a liquid crystal display device, a plasma display device, a quantum dot display device, or the like within the spirit and the scope of the disclosure.

The display unit 100 may include a pixel PX electrically connected to a data line DL, a first scan line SL, a second scan line SSL, and a sensing line RL. The display unit 100 may include the plurality of pixels PX electrically connected to the plurality of data lines DL, the plurality of first scan lines SL, the plurality of second scan lines SSL, and the plurality of sensing lines RL.

The pixel PX may receive a first driving voltage VDD, a second driving voltage VSS, and an initialization voltage from external sources. A detailed configuration, or structure, of the pixel PX will be described with reference to FIG. 2 below.

FIG. 1 illustrates that the first scan line SL and the second scan line SSL are electrically connected to the pixel PX, but the disclosure is not limited thereto. According to embodiments, one or more emission control lines may be additionally formed or disposed in the display unit 100 corresponding to a circuit structure of the pixel PX.

The scan driver 200 receives a scan control signal SCS from the timing controller 400. The scan driver 200 may supply a first scan signal to each of the first scan lines SL and may supply a second scan signal to each of the second scan lines SSL in response to the scan control signal SCS.

The scan driver 200 may sequentially supply the first scan signal to the first scan lines SL. For example, the first scan signal may be set to have a gate-on voltage such that transistors included in the pixel PX may be turned on. The first scan signal may be used to apply a data signal to the pixel PX.

The scan driver 200 may supply the second scan signal to the second scan lines SSL. For example, the second scan signal may be set to have a gate-on voltage such that the transistors included in the pixel PX may be turned on. The second scan signal may be used to sense (or extract) a driving current flowing in the pixel PX or to apply an initialization voltage to the pixel PX.

In FIG. 1, one scan driver 200 is illustrated as outputting both the first scan signal and the second scan signal, but the disclosure is not limited thereto. According to embodiments, the scan driver 200 may include a first scan driver that supplies the first scan signal to the display unit 100 and a second scan driver that supplies the second scan signal to the display unit 100. For example, the first scan driver and the second scan driver may be implemented as separate components.

The data driver 300 receives a data control signal DCS from the timing controller 400. The data driver 300 receives compensation data DATA2 from the compensator 600. The data driver 300 may generate data signals (or data voltages) in response to the data control signal DCS and the compensation data DATA2 and may supply the generated data signals to the data lines DL. For example, the data driver 300 may supply the data signal (or data voltage) to the display unit 100 during a display period of one frame period of each of the pixels PX.

In an embodiment, the data driver 300 may generate a data signal (or data voltage) corresponding to a data value (or grayscale value) included in the compensation data DATA2 using gamma voltages. Here, the gamma voltages may be generated by the data driver 300 or may be supplied from a separate gamma voltage generation circuit (for example, a gamma integrated circuit). For example, the data driver 300 may select one gamma voltage from the gamma voltages based on the data value and output the selected gamma voltage as a data signal.

The data driver 300 may supply initialization power to the sensing lines RL during a display period. The data driver 300 may apply the initialization voltage to the sensing lines RL in a sensing mode (or sensing period) and may sense the emission characteristics of each pixel PX through the sensing lines RL.

In an embodiment, although the sensing lines RL are illustrated as being electrically connected to the data driver 300, according to embodiments, a separate sensing unit may be provided, and thus, the data driver 300 and the sensing unit may be implemented as separate components.

The emission characteristics of the pixel PX may include a threshold voltage, mobility, and characteristic information (for example, current-voltage characteristics) of at least one transistor (for example, a driving transistor) in the pixel PX.

The timing controller 400 may receive a control signal CTL and an image signal RGB from an image source such as an external graphic device. The timing controller 400 may generate the data control signal DCS and the scan control signal SCS in response to the control signal CTL supplied from an external source. The data control signal DCS generated by the timing controller 400 may be supplied to the data driver 300, and the scan control signal SCS generated by the timing controller 400 may be supplied to the scan driver 200.

The timing controller 400 may supply image data DATA1, in which the image signal RGB supplied from an external source may be realigned, to the compensator 600.

The storage unit 500 may store temperature data of the display unit 100 obtained by an external imaging device. Here, a part in which temperature data of the display unit 100 is stored may be referred to as a first storage unit. Each of the pixels PX provided or disposed in the display unit 100 may include one or more element sets SET (see FIGS. 2 and 3) including a plurality of light-emitting elements LD (see FIGS. 2 and 3). The imaging device may photograph a display area of the display unit 100 and generate temperature data of the element set SET (or the pixels PX) according to light emission of the light-emitting element LD. The temperature data may be temperature data of areas including the plurality of pixels PX divided into predetermined areas included in the display unit 100 and may be temperature data of predetermined element sets SET included in one pixel PX.

In the display device according to an embodiment, temperature data can be extracted to control the luminous efficiency of the display device, and power consumption can be varied by the luminous efficiency. The luminous efficiency is a physical quantity that indicates brightness of light relative to power consumed by the display device. For example, as the luminous efficiency is lower, the brightness of light may be decreased relative to power consumption, and as the light luminous efficiency is higher, the brightness of light may be increased relative to the power consumption.

In an embodiment, an element set SET having a temperature higher than an average temperature may be extracted, and a current applied to the display unit 100 may be controlled to be a current having a value smaller or less than that of an initially applied current in order to optimize luminous efficiency, thereby improving luminous efficiency. Accordingly, the luminance characteristics of the display device can be improved, and power consumed by the display device can be reduced.

In an embodiment, it is possible to infer that the number of the light-emitting elements LD included in the element sets SET is large or small based on the temperature data. The same driving current may be applied to the element sets SET. However, due to a difference in the number of light-emitting elements LD included in the element sets SET, a current applied to one light-emitting element LD may be different. For example, in case that a first element set may include fewer light-emitting elements LD than a second element set, a temperature of the first element set may be higher than a temperature of the second element set. This is because the same driving current is applied to the element sets SET, and as the number of the light-emitting elements LD is decreased, a current (or current stress) applied to one light-emitting element LD is increased. Accordingly, it can be understood that an element set SET having high-temperature data may include a smaller number of the light-emitting elements LD than an element set SET having low-temperature data. For example, the element sets SET having a high temperature may include fewer light-emitting elements LD than the element sets SET having a low temperature. The element sets SET including a small number of the light-emitting elements LD may have lower luminous efficiency than other element sets SET.

The storage unit 500 may further include a second storage unit that stores luminance data of the element set SET (or pixel PX). The second storage unit may provide luminance data of the element sets SET to the compensator 600. For example, the luminance data stored in the second storage unit may be a value corresponding to at least one of about 0 to about 255 gray levels. Also, the luminance data may be a value corresponding to a current applied to the display unit 100. Such luminance data may be a value previously stored in a lookup table (LUT) of the storage unit 500 in a manufacturing process before a product is released.

The compensator 600 may generate the compensation data DATA2 by compensating for the image data DATA1 based on the temperature data of the element sets SET and the luminance data of the element sets SET.

The storage unit 500 may be implemented as a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM).

The compensator 600 may generate the compensation data DATA2 by compensating for the image data DATA1 based on the temperature data of the element sets SET of the display unit 100 provided from the storage unit 500 (or first storage unit).

The compensator 600 may extract an element set SET having temperature data with a temperature higher than an average temperature among pieces of temperature data of the element sets SET provided from the storage unit 500 and may compensate for the image data DATA1 based on the extracted element set SET. For example, the compensator 600 may compensate for the image data DATA1 by referring to an LUT stored in a memory. The lookup table LUT may store gradation data, a data voltage range of the image data DATA1 applied to the display unit 100, a gamma table, and the like in order to correspond to the extracted element set SET.

The compensator 600 may reduce a current applied to the display unit 100 based on a current density of the element set SET having temperature data with a temperature higher than an average temperature. For example, in order to lower the current density of the element set SET having temperature data with a temperature higher than an average temperature, the compensator 600 may compensate for the image data DATA1 such that a current lower than a predetermined current may be applied to the display unit 100 (or pixels PX, light-emitting units EMU, or element sets SET). Currents having the same magnitude may be applied to the light-emitting units EMU including at least one element set SET of the display unit 100 such that a predetermined current density may be maintained in each light-emitting unit EMU. Accordingly, in the display device, the current density of the element sets SET of the display unit 100 can be controlled to optimize luminous efficiency, thereby improving the overall luminous efficiency. Since the luminous efficiency is improved, power consumption of the display device can be decreased.

The compensator 600 may receive temperature data and luminance data of the element sets SET from the storage unit 500 and may generate the compensation data DATA2 by compensating for the image data DATA1 based on luminance data of an element set SET having an average temperature.

The compensator 600 may compensate for the image data DATA1 by reflecting the luminance data of the element set SET having an average temperature such that the display unit 100 has the maximum luminance. As the luminance of the display unit 100 is increased, the luminous efficiency of the display device may be decreased. Therefore, the compensator 600 may generate the compensation data DATA2 by compensating the image data DATA1 such that a current applied to the element set SET (or light-emitting unit EMU) falls within a range that not significantly reduces luminous efficiency. For example, the compensator 600 may generate the compensation data DATA2 such that the maximum value of a current density of the element set SET having an average temperature is less than or equal to about 30% of a current density corresponding to the maximum luminance of the corresponding element set SET. A method of determining the maximum value of a current density for optimizing luminous efficiency will be described in detail in FIG. 6 below.

In FIG. 1, although the scan driver 200, the data driver 300, the timing controller 400, and the compensator 600 are illustrated as being independently provided, this is merely example, and the disclosure is not limited thereto. For example, at least one of the scan driver 200, the data driver 300, the timing controller 400, and the compensator 600 may be provided or disposed in the display unit 100 or may be implemented as an integrated circuit, mounted on a flexible circuit board, and electrically connected to the display unit 100. For example, the scan driver 200 may be provided or disposed in the display unit 100. At least two of the scan driver 200, the data driver 300, the timing controller 400, and the compensator 600 may be implemented as one integrated circuit. For example, the data driver 300 and the compensator 600 may be implemented as one integrated circuit.

Hereinafter, a pixel of a display device according to an embodiment will be described with reference to FIGS. 2 to 4B.

Figure 2:
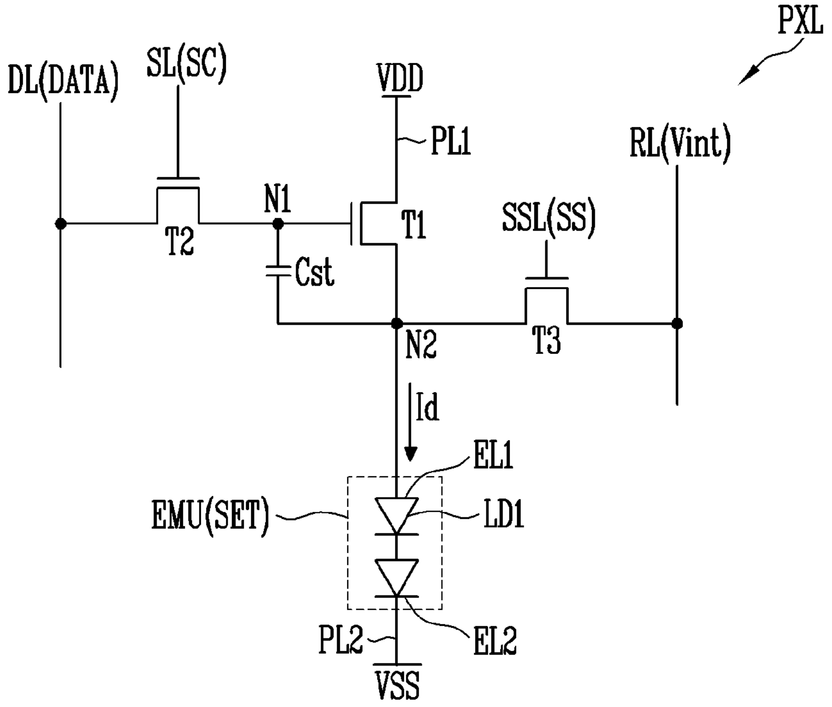
FIGS. 2 and 3 are equivalent circuit diagrams illustrating examples of a pixel included in the display device of FIG. 1.
Figure 3:
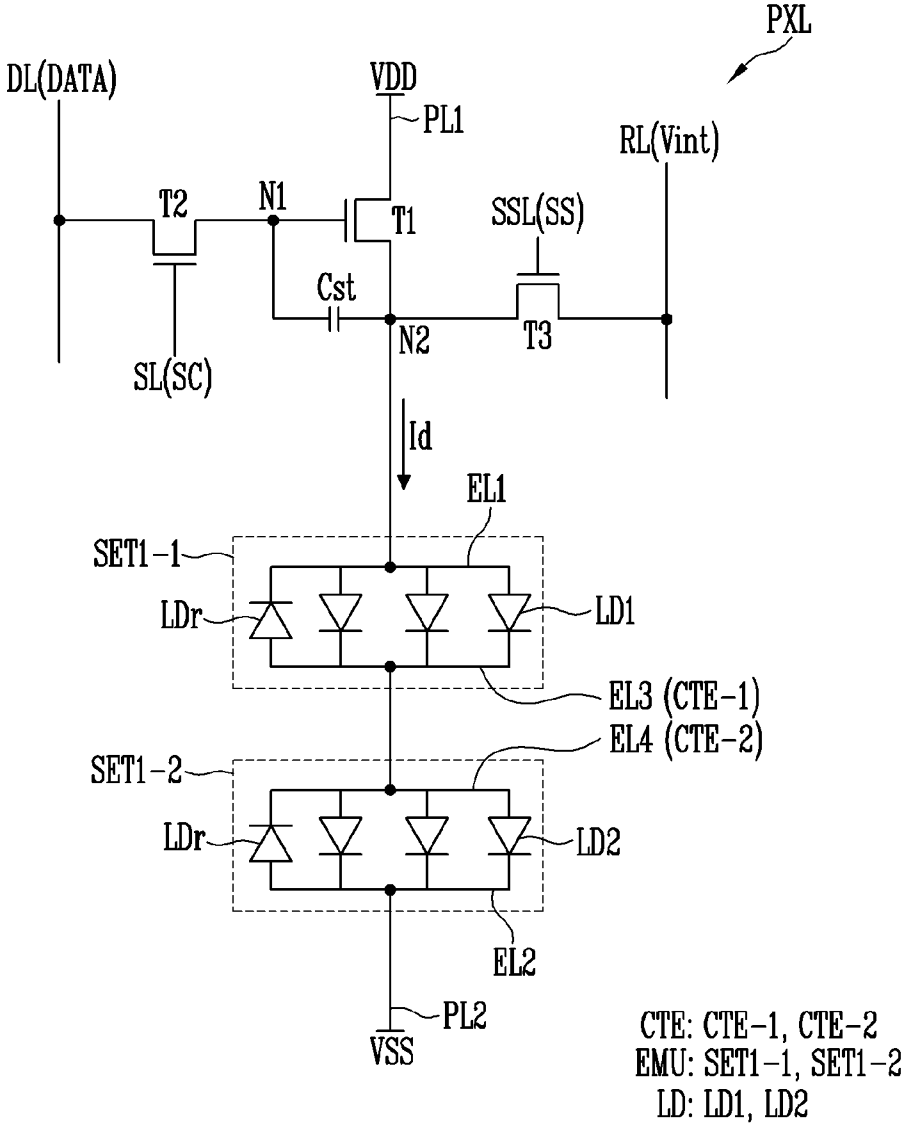
Figure 4A:
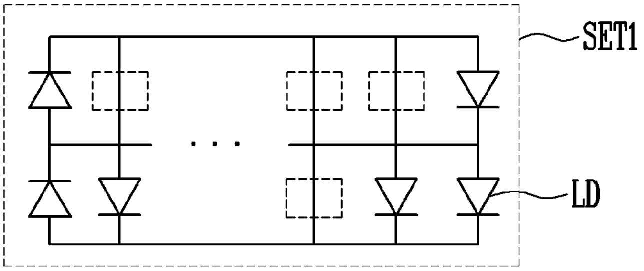
FIG. 4A and FIG. 4B show equivalent circuit diagrams partially illustrating configurations of element sets according to an embodiment.
Figure 4B:
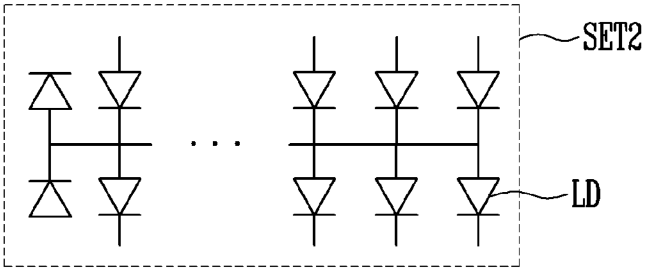

FIGS. 2 and 3 are equivalent circuit diagrams illustrating examples of the pixel included in the display device of FIG. 1, FIG. 4A, and FIG. 4B shows equivalent circuit diagrams partially illustrating configurations of element sets according to an embodiment.

Referring to FIGS. 2 and 3, a pixel PX may include a first transistor T1, a second transistor T2, a third transistor T3, a storage capacitor Cst, and a light-emitting unit EMU.

A first electrode of the first transistor T1 (or driving transistor) may be electrically connected to a first power line PL1, and a second electrode thereof may be electrically connected to a first electrode EL1 of the light-emitting unit EMU (or second node N2). A gate electrode of the first transistor T1 may be electrically connected to a first node N1. In an embodiment, the first electrode may be a drain electrode, and the second electrode may be a source electrode. The first transistor T1 may control a current amount of a driving current Id flowing to the light-emitting unit EMU in response to a voltage of the first node N1.

A first electrode of the second transistor T2 (or switching transistor) may be electrically connected to a data line DL, and a second electrode thereof may be electrically connected to the first node N1 (or gate electrode of the first transistor T1). A gate electrode of the second transistor T2 may be electrically connected to a first scan line SL. When a first scan signal SC (for example, a high level voltage) is supplied to a first scan line SL, the second transistor T2 may be turned on to transmit a data voltage DATA from the data line DL to the first node N1.

A first electrode of the third transistor T3 may be electrically connected to a sensing line RL, and a second electrode thereof may be electrically connected to the second node N2 (or second electrode of the first transistor T1). A gate electrode of the third transistor T3 may be electrically connected to a second scan line SSL. When a second scan signal SS (for example, a high level voltage) is supplied to the second scan line SSL during a predetermined sensing period, the third transistor T3 may be turned on to electrically connect the sensing line RL and the second node N2.

The storage capacitor Cst may be electrically connected between the first node N1 and the second node N2. The storage capacitor Cst may be charged with a data voltage DATA corresponding to a data signal supplied to the first node N1 during one frame. Accordingly, the storage capacitor Cst may store a voltage difference between the first node N1 and the second node N2. As an example, the storage capacitor Cst may store a voltage corresponding to a difference between the data voltage DATA supplied to the gate electrode of the first transistor T1 and an initialization voltage Vint supplied to the second electrode of the first transistor T1.

The light-emitting unit EMU may include a plurality of light-emitting elements LD electrically connected in series and/or parallel between the first power line PL1 to which a first driving voltage VDD may be applied and a second power line PL2 to which a second driving voltage VSS may be applied. As an example, the light-emitting unit EMU with reference to FIG. 2 may include the plurality of light-emitting elements LD electrically connected in series, and the light-emitting unit EMU with reference to FIG. 3 may include the plurality of light-emitting elements LD electrically connected in series and in parallel. Among the plurality of light-emitting elements LD electrically connected in parallel, each of the light-emitting elements LD electrically connected in the same direction may constitute an effective light source. The light-emitting elements LD electrically connected in parallel in the same direction may constitute an element set SET.

The light-emitting unit EMU may include the plurality of light-emitting elements LD electrically connected in series and/or parallel between the first electrode EL1 electrically connected to the second node N2 and a second electrode EL2 electrically connected to the second power line PL2. Here, the first electrode EL1 may be an anode, and the second electrode EL2 may be a cathode.

Referring to FIG. 3, a third electrode EL3 may be a cathode, and a fourth electrode EL4 may be an anode.

In an embodiment, the light-emitting unit EMU may include a first sub-element set SET1-1 and a second sub-element set SET1-2 electrically connected between the second node N2 and the second power line PL2. The first sub-element set SET1-1 may include one or more light-emitting elements LD1 electrically connected in the same direction between the first electrode EL1 and the third electrode EL3. The second sub-element set SET1-2 may include one or more light-emitting elements LD2 electrically connected in the same direction between the fourth electrode EL4 and the second electrode EL2. The first sub-element set SET1-1 may further include a reverse light-emitting element LDr electrically connected in an opposite direction between the first electrode EL1 and the third electrode EL3, and the second sub-element set SET1-2 may further include a reverse light-emitting element LDr electrically connected in an opposite direction between the fourth electrode EL4 and the second electrode EL2.

A first sub-intermediate electrode CTE-1 of the first sub-element set SET1-1 and a second sub-intermediate electrode CTE-2 of the second sub-element set SET1-2 may be integral with each other to be electrically connected to each other. The first sub-intermediate electrode CTE-1 and the second sub-intermediate electrode CTE-2 may constitute an intermediate electrode CTE for electrically connecting the first sub-element set SET1-1 and the second sub-element set SET1-2 that are consecutively formed. In case that the first sub-intermediate electrode CTE-1 and the second sub-intermediate electrode CTE-2 may be integral with each other, the first sub-intermediate electrode CTE-1 and the second sub-intermediate electrode CTE-2 may be different areas of the intermediate electrode CTE.

The light-emitting unit EMU may generate light having a predetermined luminance in response to the driving current Id supplied from the first transistor T1. For example, during one frame period, the first transistor T1 may supply the driving current Id corresponding to a gradation value of a corresponding frame data (for example, the compensation data DATA2, see FIG. 1) to the light-emitting unit EMU. The driving current Id supplied to the light-emitting unit EMU may be divided to flow to the light-emitting elements LD (or element sets SET). Accordingly, while each light-emitting element LD emits light at a luminance corresponding to a current flowing therein, the light-emitting unit EMU (or element set SET) may emit light at a luminance corresponding to the driving current Id.

The circuit structure of the pixel PX in the disclosure is not limited to those shown in FIGS. 2 and 3. For example, the light-emitting element LD may be positioned or disposed between the first power line PL1 and the first electrode of the first transistor T1.

Although the transistors are illustrated as N-channel metal oxide semiconductor (NMOS) transistors in FIGS. 2 and 3, the disclosure is not limited thereto. For example, at least one of the first to third transistors T1, T2, and T3 may be implemented as a P-channel metal oxide semiconductor (PMOS) transistor.

Referring to FIG. 4A and FIG. 4B, FIG. 4A and FIG. 4B illustrate element sets including different numbers of the light-emitting elements LD. Here, a first element set SET1 and a second element set SET2 may be included in separate pixels PX.

The first element set SET1 and the second element set SET2 shown at upper sides of FIGS. 4A and 4B each include the plurality of light-emitting elements LD electrically connected in series and in parallel.

In a display device including a plurality of inorganic light-emitting elements, the plurality of light-emitting elements LD may be provided or located in an area (for example, an emission area)) between areas in which an anode and a cathode may be disposed. For example, the light-emitting elements LD may be provided or disposed in the form dispersed in a predetermined solution and may be supplied on the anode and the cathode using an inkjet method or the like within the spirit and the scope of the disclosure. However, in case that an ink is not properly ejected due to a problem such as clogging of a nozzle in an inkjet printing apparatus, the light-emitting elements LD may not be properly provided or disposed or located in a desired number and position in the emission area. Accordingly, in case that a smaller number of the light-emitting elements LD than an average number is distributed in the emission area, luminous efficiency may be lowered.

For example, the plurality of light-emitting elements LD are properly deposited in the second element set SET2. On the other hand, in the first element set SET1, the light-emitting elements LD are not properly deposited in a partial area (for example, in a quadrangle shown with a dotted line).

The light-emitting elements LD of the first element set SET1 and the second element set SET2 may generate light having a predetermined luminance by the driving current Id supplied from the first transistor T1. The driving current Id supplied to the first element set SET1 and the second element set SET2 may be divided to flow to the light-emitting elements LD. Accordingly, while the light-emitting elements LD of the first element set SET1 and the second element set SET2 may emit light having a luminance corresponding to the driving current Id, the first element set SET1 and the second element set SET2 may emit light having a luminance corresponding to the driving current Id.

However, due to the difference in the number of the light-emitting elements LD included in the first element set SET1 and the second element set SET2, a current applied to one light-emitting element LD may be increased, and a temperature of the first element set SET1 including a small number of the light-emitting elements LD of may be increased. This is because the same driving current Id is applied to the first element set SET1 and the second element set SET2, but as the number of the light-emitting elements LD is decreased, a current (current stress) applied to one light-emitting element is increased.

In an embodiment, a current applied to the element set SET (or light-emitting unit EMU) may be controlled in response to a temperature of the element set SET (or the number of the light-emitting elements LD included in the element set SET), thereby improving the luminous efficiency of the element set SET (or light-emitting unit EMU). Thus, it is possible to optimize the luminous efficiency of the display device.

For example, in case that the number of the light-emitting elements LD included in the first element set SET1 is less than the number of the light-emitting elements LD included in the second element set SET2, the first element set SET1 may have a temperature higher than that of the second element set SET2, and the overall luminous efficiency of a display unit 100 may be lowered by the first element set SET1. In order to improve the overall luminous efficiency of the display unit 100, in the display device, compensation data may be applied such that a current smaller than a predetermined current may be applied to the element set SET (or the light-emitting unit EMU) to reduce a current density of the first element set SET1. Here, a value of the predetermined current may be a current value initially applied to the first element set SET1. For example, the display device according to an embodiment, image data DATA1 may be compensated for such that an overall current density applied to the display unit 100 may be decreased based on a current density of the element set SET having temperature data with a temperature higher than an average temperature. Accordingly, in the display device, the current density of the element sets SET can be controlled, thereby improving the overall luminous efficiency. As the luminous efficiency is improved, the power consumption of the display device may be decreased, and the lifetime of the light-emitting element LD may be increased.

In the display device according to an embodiment, it is possible to store data related to the pixel PX including the element set SET in which the light-emitting element LD is not properly deposited. In the display device, by using such data, a degree of deterioration may be sensed by focusing on the defective pixel PX in which the light-emitting element LD is not properly deposited. Therefore, in the display device, a sensing time may be reduced as compared with a case where all the pixels PX of the display unit 100 are sensed.

Hereinafter, the temperature and luminous efficiency of the display unit will be described with reference to FIGS. 5 and 6.

Figure 5:
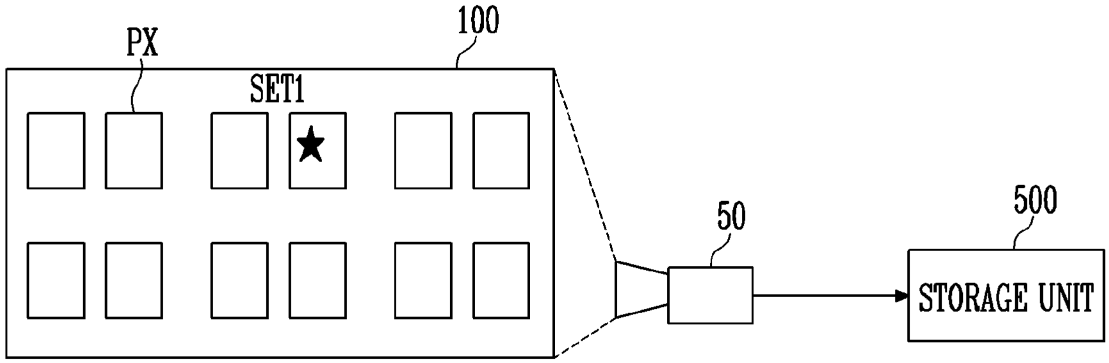
FIG. 5 is a diagram for describing a method of acquiring temperature data of a display device according to an embodiment.
Figure 6:
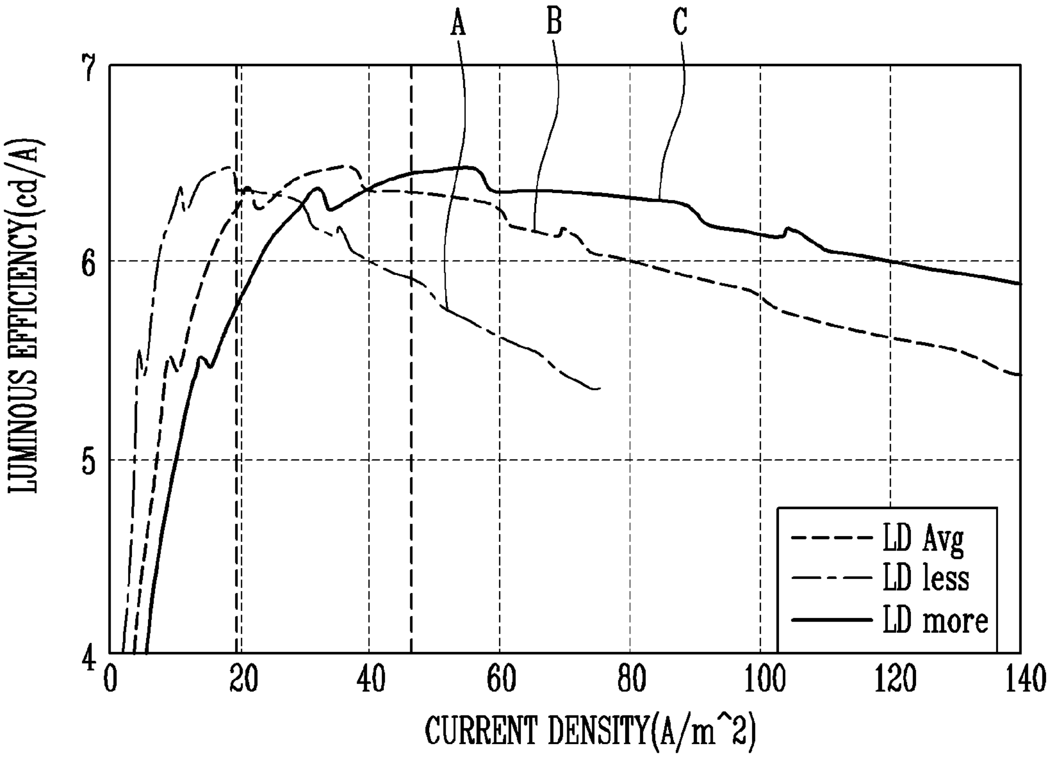
FIG. 6 is a graph for describing luminous efficiency according to a current density of the display device according to an embodiment.

FIG. 5 is a diagram for describing a method of acquiring temperature data of a display device according to an embodiment, and FIG. 6 is a graph for describing luminous efficiency according to a current density of the display device according to an embodiment.

Referring to FIG. 5, a storage unit 500 may receive temperature data acquired by an external imaging device 50. The imaging device 50 may be positioned or disposed at a predetermined angle in order to photograph an entire area of a front surface of a display unit 100.

The imaging device 50 may be implemented as a thermal imaging camera, a charge-coupled device (CCD) camera, or the like within the spirit and the scope of the disclosure. The imaging device 50 itself may include a light receiving device of each camera. The imaging device 50 itself may not include a light receiving device but may be electrically connected to an external light receiving device to receive temperature data acquired by the external light receiving device.

Each of pixels PX provided or disposed in the display unit 100 may include one or more element sets SET (see FIGS. 2 and 3) including a plurality of light-emitting elements LD (see FIGS. 2 and 3). The imaging device 50 may photograph a display area of the display unit 100 to generate temperature data of the element sets SET as the light-emitting element LD emits light.

The temperature data may be temperature data of a partial area (indicated by a star shape) including the plurality of pixels PX in the display area of the display unit 100 and may be temperature data of the predetermined element sets SET included in each pixel PX.

In an embodiment, in case that a temperature of temperature data acquired by the imaging device 50 is higher than an average temperature, a point having the corresponding temperature data may be inferred as a first element set SET1 (see FIG. 4A). In case that a temperature of temperature data acquired by the imaging device 50 corresponds to the average temperature, a point having the corresponding temperature data may be inferred as a second element set SET2 (see FIG. 4B). Here, the average temperature may have an average value of temperatures of pieces of temperature data of the element sets SET.

In the display device according to an embodiment, the luminous efficiency of the display device may be confirmed based on temperature data. For example, the element sets SET having a high temperature may have a luminous efficiency lower than that of the element sets SET having a low temperature.

Referring to FIG. 6, a dotted line (LD less) indicated by A shows a case where the number of the light-emitting elements LD included in one element set SET is less than an average number, a dotted line (LD Avg) indicated by B shows a case where the number of the light-emitting elements LD included in one element set SET is the average number, and a solid line (LD more) indicated by C shows a case where the number of the light-emitting elements LD included in one element set SET is more than the average number.

Regarding the dotted line (LD Avg) indicated by B and the solid line (LD more) indicated by C, it can be seen that in case that a current density is increased beyond a given range, luminous efficiency is gradually decreased. However, in comparison with the maximum luminous efficiency, the luminous efficiency may not be significantly decreased. For example, in the dotted line (LD Avg) indicated by B and the solid line (LD more) indicated by C, it can be seen that in case that a current density is about 40 A/m$^2$ or more and about 80 A/m$^2$, luminous efficiency is decreased in a range of about 6.5 cd/A to about 6 cd/A.

On the other hand, regarding the dotted line (LD less) indicated by A, it can be seen that in case that a current density is increased beyond a given range, luminous efficiency is abruptly decreased. For example, in the dotted line (LD less) indicated by A, it can be seen that in case that a current density is about 40 A/m$^2$ or more and about 80 A/m$^2$, luminous efficiency is abruptly decreased from 6.5 cd/A to about 5 cd/A.

As described above, in case that the number of the light-emitting elements LD included in one element set SET is less than an average number, the luminous efficiency of the display device may be abruptly decreased. As the luminous efficiency of the display device is decreased in a given area, overall luminance non-uniformity of the display device may occur.

However, in an embodiment, even in case that the numbers of the light-emitting elements LD included in the element sets SET are different, a current applied to the element set SET (or light-emitting unit EMU or display unit 100) may be controlled to be smaller than an initially applied current such that the display unit 100 (see FIG. 1) has the optimal luminous efficiency, thereby improving the luminous efficiency of the display unit 100.

In the display device according to an embodiment, the luminance of the display unit 100 may be controlled to maintain the optimal luminous efficiency. For example, the luminance of the display unit 100 (see FIG. 1) may be controlled based on luminance data of the element set SET having an average temperature of the dotted line (LD Avg) indicated by B. For example, in the display device, by reflecting the luminance data of the element set SET having an average temperature, the luminance of the display unit 100 may controlled such that the display unit 100 has the maximum luminance. As the luminance of the display unit 100 is increased, the luminous efficiency of the display device may be decreased. Therefore, in the display device, a current applied to the element set SET may be controlled such that the luminous efficiency is not significantly decreased.

Referring again to FIG. 4B, the dotted line (LD Avg) indicated by B is a graph of luminous efficiency according to a current density of the second element set SET2 on which the light-emitting elements LD are normally deposited. The second element set SET2 may have the maximum luminous efficiency in a current density range of about 20 A/m$^2$ to about 50 A/m$^2$. As the luminance of the display unit 100 is increased, for example, as the current density of the second element set SET2 is increased beyond a given range, the luminous efficiency of the display device may be decreased. In an embodiment, in order to prevent a decrease in luminous efficiency of the display device, compensation data DATA2 (see FIG. 1) applied to the display unit 100 may be controlled such that the current density of the second element set SET2 corresponds to a range of about 20 $A/m^2$ to about 50 $A/m^2$. For example, the compensation data DATA2 may be controlled such that the maximum value of the current density of the second element set SET2 corresponds to about 30% or less of a current density corresponding to the maximum luminous efficiency of the second element set SET2. Here, the range of the current density and the range of the maximum value are merely an example, and the range of the current density and the range of the maximum value of each element set may be variously changed according to embodiments.

As described above, the display device according to an embodiment may generate the compensation data DATA2 to correspond to a range in which luminous efficiency is not degraded while maintaining the maximum luminance of the element sets SET.

Hereinafter, a method of driving a display device according to an embodiment will be described with reference to FIGS. 7 and 8.

Figure 7:
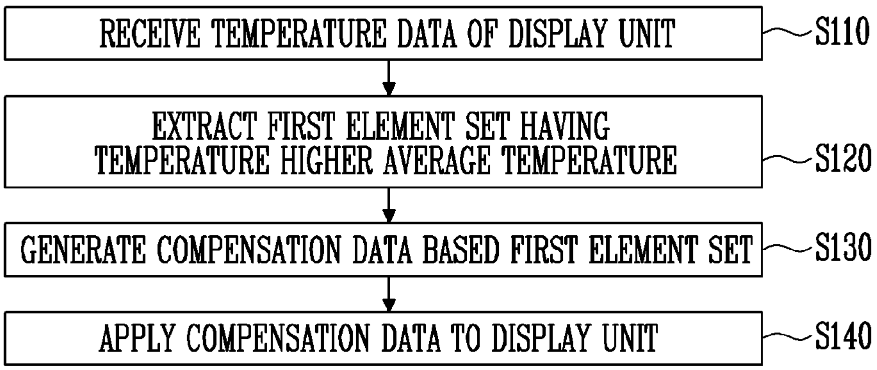
FIG. 7 is a flowchart of a method of driving a display device according to an embodiment.
Figure 8:
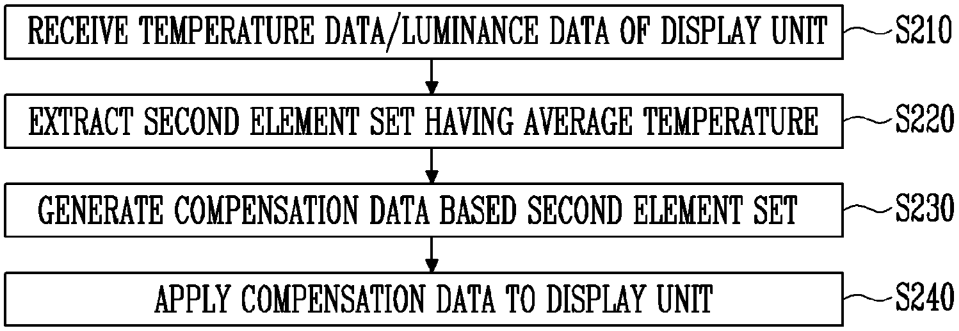
FIG. 8 is a flowchart of a method of driving a display device according to an embodiment.

FIG. 7 is a flowchart of a method of driving a display device according to an embodiment, and FIG. 8 is a flowchart of a method of driving a display device according to an embodiment. In FIGS. 7 and 8, descriptions will be given with reference to FIGS. 1 to 6, and hereinafter, reference numerals with reference to FIGS. 1 to 6 will be used.

Referring to FIG. 7, the display device according to an embodiment may receive temperature data of a display unit 100. Here, the display unit 100 may include one or more element sets SET including light-emitting elements LD, and temperature data of the display unit 100 may be temperature data of the element sets SET. The temperature data may be provided from an external imaging device 50 and may have a value stored in a storage unit 500 (or first storage unit).

A compensator 600 may receive pieces of temperature data of the element sets SET from the storage unit 500 (S110) to extract a first element set SET1 having temperature data with a temperature higher than an average temperature among the pieces of temperature data (S120).

Thereafter, the compensator 600 may compensate image data DATA1 based on the extracted first element set SET1 to generate compensation data DATA2 (S130). The generated compensation data DATA2 may be applied to the display unit 100 by a data driver 300 (S140). The compensation data DATA2 may have a value corresponding to a current smaller or less than an initial current applied to the first element set SET1.

Accordingly, in the display device, a current density of the element sets SET of the display unit 100 can be controlled to optimize luminous efficiency, thereby improving the overall luminous efficiency.

Referring to FIG. 8, the display device according to an embodiment may receive temperature data and luminance data of the display unit 100. The luminance data may have luminance values of the element sets SET of the display unit 100 and may have values previously stored in the storage unit 500 (or second storage unit). The temperature data may be provided from the external imaging device 50 and may have a value stored in the storage unit 500 (or first storage unit).

The compensator 600 may receive pieces of temperature data of the element sets SET from the storage unit 500 (S210) to extract a second element set SET2 having an average temperature (S220).

Thereafter, the compensator 600 may compensate image data DATA1 based on the extracted second element set SET2 to generate compensation data DATA2 (S230). The generated compensation data DATA2 may be applied to the display unit 100 by the data driver 300 (S240). The compensation data DATA2 may have a value compensated for based on luminance data of the second element set SET2. For example, the compensation data DATA2 may have a value at which maximum luminance may be implemented in the display unit 100.

As the luminance of the display device is increased, the luminous efficiency of the display device may be decreased. Accordingly, the display device according to an embodiment may generate the compensation data DATA2 to correspond to a range in which the luminous efficiency is not decreased. For example, the compensator 600 may generate the compensation data DATA2 such that the maximum value of the current density of the second element set SET2 corresponds to about 30% or less of a current density corresponding to the maximum luminous efficiency of the second element set SET2.

Accordingly, in the display device according to an embodiment, the luminance of the display device may be controlled in order to correspond to a range in which luminous efficiency can be improved.

Hereinafter, a light-emitting element included in the display device according to an embodiment will be described with reference to FIGS. 9 and 10.

Figure 9:
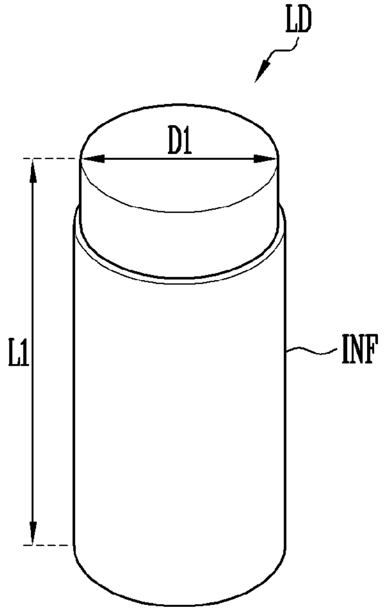
FIG. 9 is a perspective view illustrating an example of a light-emitting element included in a display device according to an embodiment.
Figure 10:
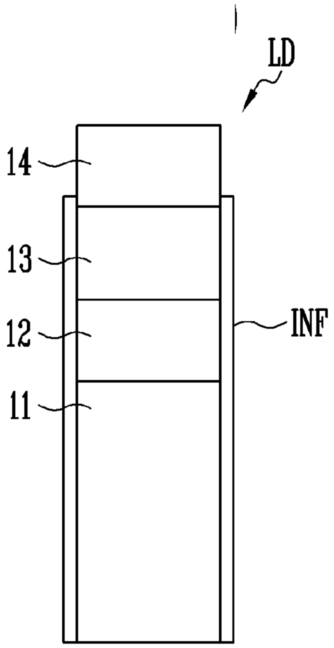
FIG. 10 is a schematic cross-sectional view of FIG. 9.

FIG. 9 is a perspective view illustrating an example of a light-emitting element included in a display device according to an embodiment, and FIG. 10 is a schematic cross-sectional view of FIG. 9.

FIGS. 9 and 10 illustrate a light-emitting element having a substantially columnar shape, the type and/or shape of the light-emitting element according to the disclosure is not limited thereto.

Referring to FIGS. 9 and 10, a light-emitting element LD according to an embodiment may include a first semiconductor layer 11, a second semiconductor layer 13, and an active layer 12 positioned or disposed between the first semiconductor layer 11 and the second semiconductor layer 13. As an example, the light-emitting element LD may be formed as a stack in which the first semiconductor layer 11, the active layer 12, and the second semiconductor layer 13 may be sequentially stacked in a direction of a length L1.

According to embodiments, the light-emitting element LD may be substantially a rod shape, for example, a substantially cylindrical shape extending in one direction or in a direction. In case that it is considered that an extending direction of the light-emitting element LD is the direction of the length L1, the light-emitting element LD may have one or an end portion and the other or another end portion in the direction of the length L1.

According to embodiments, one of the first semiconductor layer 11 and the second semiconductor layer 13 may be disposed at one or an end portion of the light-emitting element LD, and the other or another of the first semiconductor layer 11 and the second semiconductor layer 13 may be disposed at the other or another end portion of the light-emitting element LD.

According to embodiments, the light-emitting element LD may be a substantially rod-shaped light-emitting diode manufactured in a substantially rod shape. In the specification, the term "rod shape" may include all of a rod-like shape and a bar-like shape, such as a substantially circular column and a substantially polygonal column, which may be long in the direction of the length L1 (for example, have an aspect ratio greater than one). A shape of a cross section of the substantially rod shape is not particularly limited. For example, the length L1 of the light-emitting element LD may be greater than a diameter D1 (or width of a cross section).

According to embodiments, the light-emitting element LD may have a small size ranging from a nanometer scale to a micrometer scale. The light-emitting element LD may have the diameter D1 and/or the length L1 which may each range from a nanometer scale to a micrometer scale. As an example, the length L1 of the light-emitting element LD may be in a range of about 100 nm to about 10 μm, the diameter D1 of the light-emitting element LD may be in a range of about 2 μm to about 6 μm, and the aspect ratio of the light-emitting element LD may be in a range of about 1.2 to about 100. However, the size of the light-emitting element LD is not limited thereto. For example, the size of the light-emitting element LD may be variously changed according to design conditions of various devices, for example, a display device which uses a light-emitting device including the light-emitting element LD as a light source.

The first semiconductor layer 11 may include at least one n-type semiconductor layer. For example, the first semiconductor layer 11 may include an n-type semiconductor layer which may include any one semiconductor material selected from InAlGaN, GaN, AlGaN, InGaN, AlN, and InN and doped with a first conductivity-type dopant such as silicon (Si), germanium (Ge), tin (Sn), or the like within the spirit and the scope of the disclosure. However, a material constituting the first semiconductor layer 11 is not limited thereto, and the first semiconductor layer 11 may be made of various materials.

The active layer 12 may be disposed on the first semiconductor layer 11 and may be formed to have a single-quantum well or multi-quantum well structure. In an embodiment, a clad layer (not shown) doped with a conductive dopant may be formed or disposed on and/or below the active layer 12. As an example, the clad layer may be formed as an AlGaN layer or an InAlGaN layer. According to embodiments, a material such as AlGaN or InAlGaN may be used to form the active layer 12, and in addition, various materials may constitute the active layer 12.

When a voltage greater than or equal to a threshold voltage is applied to both end portions of the light-emitting element LD, electrons and holes are combined with each other in the active layer 12, and thus, the light-emitting elements LD emits light. By controlling light emission of the light-emitting element LD using such a principle, the light-emitting element LD may be used as a light source of various light-emitting devices including pixels of a display device.

The second semiconductor layer 13 may be disposed on the active layer 12 and may include a semiconductor layer which may be a different type from the first semiconductor layer 11. As an example, the second semiconductor layer 13 may include at least one p-type semiconductor layer. For example, the second semiconductor layer 13 may include a p-type semiconductor layer which may include at least one semiconductor material selected from InAlGaN, GaN, AlGaN, InGaN, AlN, and InN and doped with a second conductivity-type dopant such as magnesium (Mg), zinc (Zn), calcium (Ca), strontium (Sr), or barium (Ba). However, a material constituting the second semiconductor layer 13 is not limited thereto, and the second semiconductor layer 13 may be made of various materials.

In the above-described embodiment, it has been described that the first semiconductor layer 11 and the second semiconductor layer 13 are each formed as one layer, but the disclosure is not limited thereto. In an embodiment, each of the first semiconductor layer 11 and the second semiconductor layer 13 may further include one or more layers, for example, a clad layer and/or a tensile strain barrier reducing (TSBR) layer according to a material of the active layer 12. The TSBR layer may be a strain reducing layer disposed between semiconductor layers having different lattice structures to serve as a buffer for reducing a lattice constant difference. The TSBR layer may be formed as a p-type semiconductor layer including p-GaInP, p-AlInP, or p-AlGaInP, but the disclosure is not limited thereto. According to embodiments, the light-emitting element LD may further include an insulating film INF provided or disposed on a surface thereof. The insulating film INF may be formed or disposed on the surface of the light-emitting element LD in order to surround an outer circumferential surface of the active layer 12. The insulating film INF may further surround one or a region of the first and second semiconductor layers 11 and 13. However, the insulating film INF may expose both end portions of the light-emitting element LD which may have different polarities. For example, the insulating film INF may expose one ends of the first and second semiconductor layers 11 and 13 positioned or disposed at both end portions of the light-emitting element LD in the direction of the length L1, for example, two base sides of a cylinder (for example, an upper surface and a lower surface of the light-emitting element LD) without covering or overlapping the one ends.

In an embodiment, the light-emitting element LD may further include additional components in addition to the first semiconductor layer 11, the active layer 12, the second semiconductor layer 13, and/or the insulating film INF. For example, the light-emitting element LD may additionally include a fluorescent layer, an active layer, a semiconductor layer, and/or an electrode disposed at one or end sides of the first semiconductor layer 11, the active layer 12, and/or the second semiconductor layer 13.

An electrode 14 disposed on one or an end side of the light-emitting element LD may be an ohmic contact electrode or a Schottky contact electrode but is not limited thereto. The electrode 14 may include a metal or a metal oxide. For example, chromium (Cr), titanium (Ti), aluminum (Al), gold (Au), nickel (Ni), indium tin oxide (ITO), indium zinc oxide (IZO), indium tin zinc oxide (ITZO), and oxides or alloys thereof may be used alone or in a mixture thereof. Furthermore, according to embodiments, the electrode 14 may be substantially transparent or semi-transparent. Accordingly, light generated by the light-emitting element LD may pass through the electrode 14 to be emitted to the outside of the light-emitting element LD.

According to embodiments, the insulating film INF may or may not at least partially surround an outer circumferential surface of the electrode 14. For example, the insulating film INF may be selectively formed or disposed on a surface of the electrode 14. The insulating film INF may be formed or disposed to expose both end portions of the light-emitting element LD which may have different polarities, and for example, the insulating film INF may expose at least one region or a region of the electrode 14. According to embodiments, the insulating film INF may not be provided or disposed at the end or at an end portion of the light-emitting element LD.

In case that the insulating film INF is provided or disposed on the surface of the light-emitting element LD, for example, the surface of the active layer 12, it is possible to prevent the active layer 12 from being short-circuited with at least one electrode (not shown) (for example, at least one contact electrode of contact electrodes electrically connected to both end portions of the light-emitting element LD). Accordingly, electrical stability of the light-emitting element LD may be secured.

In case that the insulating film INF may be formed or disposed on the surface of the light-emitting element LD, surface defects of the light-emitting element LD may be minimized, thereby improving the lifetime and efficiency of the light-emitting element LD. In case that the insulating film INF may be formed or disposed in the light-emitting element LD, it is possible to prevent an undesired short circuit between the light-emitting elements LD even in case that the plurality of light-emitting elements LD are closely disposed.

In an embodiment, the light-emitting element LD may be manufactured through a surface treatment process. For example, in case that the plurality of light-emitting elements LD are mixed in a flowable solution (or solvent) and supplied to each emission area (for example, an emission area of each pixel), the light-emitting elements LD may each be surface-treated in order to be uniformly dispersed without being non-uniformly aggregated in the solution.

The light-emitting element LD may be used in various types of devices, such as a display device, which require a light source. For example, one or more light-emitting element LD, for example, the plurality of light-emitting elements LD having a size ranging from a nanometer scale to a micrometer scale may be disposed in each pixel area of a display device, and a light source (or light-emitting unit) of each pixel may be constructed using the light-emitting elements LD. However, the application field of the light-emitting element LD is not limited to a display device in the disclosure. For example, the light-emitting element LD may be used in other types of devices, such as a lighting device, which require a light source.

According to an embodiment, a current applied to light-emitting units may be controlled to be smaller than an initially applied current in response to a temperature of an element set (or the number of the light-emitting elements included in the element set), thereby improving luminous efficiency.

As the luminous efficiency is improved, the luminance characteristic can be improved so that power consumed in a display device can be reduced, and the lifetime of the light-emitting element can be increased.

Effects of the disclosure are not restricted to the embodiments set forth herein and more diverse effects are included in the specification.

Although embodiments have been described, it is understood that the disclosure should not be limited to these embodiments but various changes and modifications can be made by one of ordinary skill in the art within the spirit and scope of the disclosure as hereinafter claimed.

Therefore, the technical scope of the disclosure is not limited to the embodiments described herein, but may be determined by the accompanying claims.

What is claimed is:

1. A display device comprising:

light-emitting units disposed in an emission area and including at least one element set including light-emitting elements implemented as light-emitting diodes;

a first storage unit that stores temperature data of the at least one element set; and a compensator that extracts a first element set having temperature data of a higher temperature than an average temperature among the temperature data of the at least one element set and compensates for image data based on the first element set to generate compensation data; wherein the higher temperature is based on a fewer than average number of light-emitting diodes in the first element set based on absence of operable light-emitting diode at a position in the emission area, and the compensator adjusts a current density of the display device, based on the compensation data, for improvement of a luminous efficiency of the display device.

2. The display device of claim 1, wherein the compensator compensates for the image data to generate the compensation data such that a current less than a predetermined current is applied to the light-emitting units according to the current density.

3. The display device of claim 2, wherein the predetermined current is an initial current applied to the first element set.

4. The display device of claim 1, wherein the average temperature corresponds to an average value of the temperature data of the at least one element set.

5. The display device of claim 4, wherein the compensator extracts a second element set having the average temperature among the temperature data of the at least one element set.

6. The display device of claim 5, wherein the fewer than average number of light-emitting diodes of the light-emitting elements included in the first element set is less than a number of light-emitting elements included in the second element set.

7. The display device of claim 6, wherein currents of a same magnitude are applied to the first element set and the second element set.

8. The display device of claim 5, wherein the storage unit stores luminance data of the at least one element set, and the compensator compensates for the image data based on luminance data of the second element set to generate the compensation data.

9. The display device of claim 8, wherein a maximum value of a current density of the second element set is less than or equal to 30% of a current density corresponding to a maximum luminous efficiency of the second element set according to the compensation data.

10. The display device of claim 1, wherein the temperature data of the at least one element set are provided from an external imaging device.

11. The display device of claim 1, wherein the light-emitting elements have a column shape.

12. The display device of claim 1, wherein the compensator adjusts the current density of the display device based on reducing a corresponding current density applied to the first element set to increase a corresponding luminance efficiency of the first element set relative to a corresponding luminance efficiency of a second element set in the display device.

13. A method of driving a display device including a display unit, comprising:

receiving temperature data of at least one element set including light-emitting elements disposed in an emission area and implemented as light-emitting diodes, the at least one element set being included in a light-emitting unit;

extracting a first element set having temperature data of a higher temperature than an average temperature among the temperature data of the at least one element set; and compensating for image data based on the first element set to generate compensation data; wherein the higher temperature is based on a fewer than average number of light-emitting diodes in the first element set based on an absence of an operable light-emitting diode at a position in the emission area, and the compensating causing adjustment of a current density of the display device, based on the compensation data, for improvement of a luminous efficiency of the display device.

14. The method of claim 13, wherein the compensation data is generated such that a current less than an initial current applied to the first element set is applied to the light-emitting unit.

15. The method of claim 14, further comprising applying the compensation data to the display unit.

16. The method of claim 15, wherein the temperature data of the at least one element set are provided from an external imaging device.

17. A method of driving a display device including a display unit, comprising:

receiving temperature data and luminance data of at least one element set including light-emitting elements disposed in an emission area and implemented as light-emitting diodes, the at least one element set being included in a light-emitting unit;

extracting a second element set having a higher average temperature among the temperature data of the at least one element set; and compensating for image data based on the second element set to generate compensation data; wherein the higher average temperature is based on a fewer than average number of light-emitting diodes in the second element set based on an absence of an operable light-emitting diode at a position in the emission area, and the compensating causing adjustment of a current density of the display device, based on the compensation data, for improvement of a luminous efficiency of the display device.

18. The method of claim 17, wherein the compensation data is generated by compensating for the image data based on the luminance data of the extracted second element set.

19. The method of claim 18, further comprising applying the compensation data to the display unit.

20. The method of claim 19, wherein a maximum value of a current density of the second element set is less than or equal to 30% of a current density corresponding to a maximum luminous efficiency of the second element set according to the compensation data.

* * * * *